(12) United States Patent
Tseng et al.

(10) Patent No.: US 9,857,266 B2
(45) Date of Patent: Jan. 2, 2018

(54) CORRELATION BASED FUEL TANK LEAK DETECTION

(71) Applicant: Ford Global Technologies, LLC, Dearborn, MI (US)

(72) Inventors: Fling Tseng, Ann Arbor, MI (US); Imad Hassan Makki, Dearborn Heights, MI (US); Aed M. Dudar, Canton, MI (US); Robert Roy Jentz, Westland, MI (US); Dimitar Petrov Filev, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 281 days.

(21) Appl. No.: 14/172,108

(22) Filed: Feb. 4, 2014

(65) Prior Publication Data
US 2015/0219522 A1    Aug. 6, 2015

(51) Int. Cl.
| G06F 19/00 | (2011.01) |
| G01M 3/32 | (2006.01) |
| F02M 25/08 | (2006.01) |
| G01M 3/02 | (2006.01) |
| F02D 41/22 | (2006.01) |
| F02D 41/26 | (2006.01) |

(52) U.S. Cl.
CPC ........... *G01M 3/3272* (2013.01); *F02D 41/22* (2013.01); *F02M 25/0809* (2013.01); *G01M 3/025* (2013.01); *F02D 41/266* (2013.01); *F02D 2041/225* (2013.01); *F02D 2200/0414* (2013.01); *F02D 2200/0602* (2013.01); *F02D 2200/0606* (2013.01); *F02D 2200/703* (2013.01); *Y02T 10/40* (2013.01)

(58) Field of Classification Search
USPC ......... 701/102–104, 114; 123/516, 518–520, 123/198 D, 19 D; 73/114.39, 114.43; 137/587–589
See application file for complete search history.

(56) References Cited

U.S. PATENT DOCUMENTS

| 5,964,812 A | * | 10/1999 | Schumacher | ....... | G01M 3/3209 |
| | | | | | 701/33.9 |
| 6,672,138 B2 | | 1/2004 | Cook et al. | | |
| 8,074,627 B2 | | 12/2011 | Siddiqui | | |

(Continued)

FOREIGN PATENT DOCUMENTS

JP    2013043648 A  *  3/2013

OTHER PUBLICATIONS

Machine Translation of JP2013043648A PDF File Name: "JP2013043648A_Machine_Translation.pdf".*

*Primary Examiner* — Carlos A Rivera
*Assistant Examiner* — Ruben Picon-Feliciano
(74) *Attorney, Agent, or Firm* — James Dottavio; McCoy Russell LLP (57) ABSTRACT

A method for an engine, comprising: sealing a fuel tank; and indicating fuel system degradation based on a comparison of a first correlation coefficient, determined based on a change in fuel tank pressure and a change in fuel tank temperature, to a second correlation coefficient determined based on a change in ambient pressure and a change in ambient temperature. In this way, leak tests, such as engine-off natural vacuum tests, may be performed without knowledge of the properties of the fuel stored in the fuel tank.

20 Claims, 6 Drawing Sheets (56) References Cited

U.S. PATENT DOCUMENTS

| | | |
|---|---|---|
| 2002/0128751 A1* | 9/2002 | Engstrom et al. ................. 701/1 |
| 2002/0161495 A1* | 10/2002 | Yamaki ................. G01M 15/05 |
| | | 701/33.8 |
| 2003/0019286 A1* | 1/2003 | Wakahara .......... F02M 25/0809 |
| | | 73/114.41 |
| 2010/0086414 A1* | 4/2010 | Tai ................................. 417/34 |
| 2012/0211087 A1* | 8/2012 | Dudar et al. .................... 137/12 |
| 2013/0032127 A1 | 2/2013 | Jentz et al. |
| 2013/0125997 A1 | 5/2013 | Lawrence et al. |
| 2013/0253799 A1 | 9/2013 | Peters et al. |
| 2013/0297178 A1* | 11/2013 | Hill et al. ..................... 701/102 |
| 2014/0060160 A1 | 3/2014 | Pursifull |
| 2014/0074385 A1 | 3/2014 | Dudar et al. |
| 2014/0107906 A1 | 4/2014 | Jentz et al. |

\* cited by examiner

CORRELATION BASED FUEL TANK LEAK DETECTION

BACKGROUND AND SUMMARY

Vehicles configured to run on volatile fuel are required by state and federal regulations to be capable of determining the presence of evaporative leaks of a certain size, such as 0.01". One common method for determining leaks relies on naturally occurring vacuum that builds in a sealed fuel tank following an engine off event (Engine-off natural vacuum, or EONV).

EONV tests are based on the relationship between gas temperature and pressure put forth in the ideal gas law. In a vehicle that has recently been turned off, the temperature of the fuel tank may decrease. The temperature decrease will cause fuel vapor to condense to liquid, creating a vacuum. A subsequent increase in temperature (e.g. during a diurnal cycle) will cause liquid fuel to volatize, increasing the pressure within a sealed tank. EONV tests typically involve predicting a fuel tank pressure that should be incurred due to a change in temperature over time. If the actual fuel tank pressure does not correspond to the predicted pressure, a leak may be indicated.

However, the relationship between fuel tank temperature and fuel tank pressure may be based on additional factors that may make fuel tank pressure predictions inaccurate. For example, the fuel volatility (or Reid Vapor Pressure) directly impacts the fuel vapor temperature/pressure relationship. Often, the actual fuel volatility will not be known. In another example, fuel sloshing prior to beginning the leak test may artificially increase the fuel tank pressure. Attempting to predict a fuel tank pressure when all contributing factors are not known may lead to a testing regimen that is neither accurate nor robust, which in turn may produce false results.

The inventors herein have recognized the above problems, and have developed systems and methods to at least partially address them. In one example, a method for an engine, comprising: sealing a fuel tank; and indicating fuel system degradation based on a comparison of a first correlation coefficient, determined based on a change in fuel tank pressure and a change in fuel tank temperature, to a second correlation coefficient determined based on a change in ambient pressure and a change in ambient temperature. In this way, leak tests, such as engine-off natural vacuum tests, may be performed without knowledge of the properties of the fuel stored in the fuel tank. In trying to predict an in-tank pressure change based on an in-tank temperature change, the volatility (Reid Vapor Pressure) of the fuel has an effect on the final pressure, and assuming or mis-estimating the volatility may lead to an incorrect analysis. However, the correlation between pressure and temperature may be predicted independently from the fuel properties.

In another example, a method for testing a vehicle fuel tank for leaks, comprising: sealing the vehicle fuel tank; determining whether a fuel tank fill level is between a first fill level limit and a second fill level limit; monitoring fuel tank temperature, fuel tank pressure, ambient temperature, and ambient pressure for a duration; determining entropy levels for fuel tank temperature, fuel tank pressure, ambient temperature, and ambient pressure over the duration; determining recursive means and standard deviations for fuel tank temperature, fuel tank pressure, ambient temperature, and ambient pressure over the duration; determining a first correlation coefficient based on the recursive means and standard deviations for fuel tank pressure and fuel tank temperature over the duration; determining a second correlation coefficient based on the recursive means and standard deviations for ambient pressure and ambient temperature over the duration; and indicating a fuel tank leak if the first correlation coefficient is less than the second correlation coefficient. In this way, an accurate depiction of the temperature/pressure relationship within a fuel tank may be obtained. By using recursive estimates (rather than simpler regression models), the temperature/pressure relationship may incorporate the vaporization of fuel with increases in temperature, and the condensation of fuel vapor with decreases in temperature. The correlation between temperature and pressure may then be used to accurately and robustly determine the integrity of the fuel tank.

In yet another example, a system for a vehicle, comprising: a fuel tank temperature sensor coupled to a fuel tank; a fuel tank pressure sensor coupled to the fuel tank; a fuel level sensor coupled within the fuel tank; an ambient temperature sensor; an ambient pressure sensor; one or more valves configured to seal the fuel tank when closed; and a controller configured with instructions stored in non-transitory memory, that when executed cause the controller to: seal the fuel tank; determine whether a fuel tank fill level is between a first fill level limit and a second fill level limit; monitor fuel tank temperature, fuel tank pressure, ambient temperature, and ambient pressure for a duration; determine entropy levels for fuel tank temperature, fuel tank pressure, ambient temperature, and ambient pressure over the duration; determine recursive means and standard deviations for fuel tank temperature, fuel tank pressure, ambient temperature, and ambient pressure over the duration; determine a first correlation coefficient based on the recursive means and standard deviations for fuel tank pressure and fuel tank temperature over the duration; determine a second correlation coefficient based on the recursive means and standard deviations for ambient pressure and ambient temperature over the duration; and indicate a fuel tank leak if the first correlation coefficient is less than the second correlation coefficient. The system may further comprise: a communications module configured to communicate with a cloud computing system; and the controller may be further configured with instructions stored in non-transitory memory, that when executed cause the controller to: retrieve one or more correlation models from the cloud computing system via the communications module; determine the first correlation coefficient based on the one or more correlation models; and determine the second correlation coefficient based on the one or more correlation models. In this way, leak test results and vehicle conditions from a plurality of vehicles may be aggregated at a cloud computing device and the aggregated data used to develop and refine correlation models, thresholds, and parameters. This crowd sourcing of data may allow for broad coverage of usage patterns and other impact factors to be incorporated into the parameters for a vehicle leak test, even if the vehicle itself has not previously encountered these impact factors. This, in turn, may lead to more accurate testing, and fewer testing failures.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 3A:
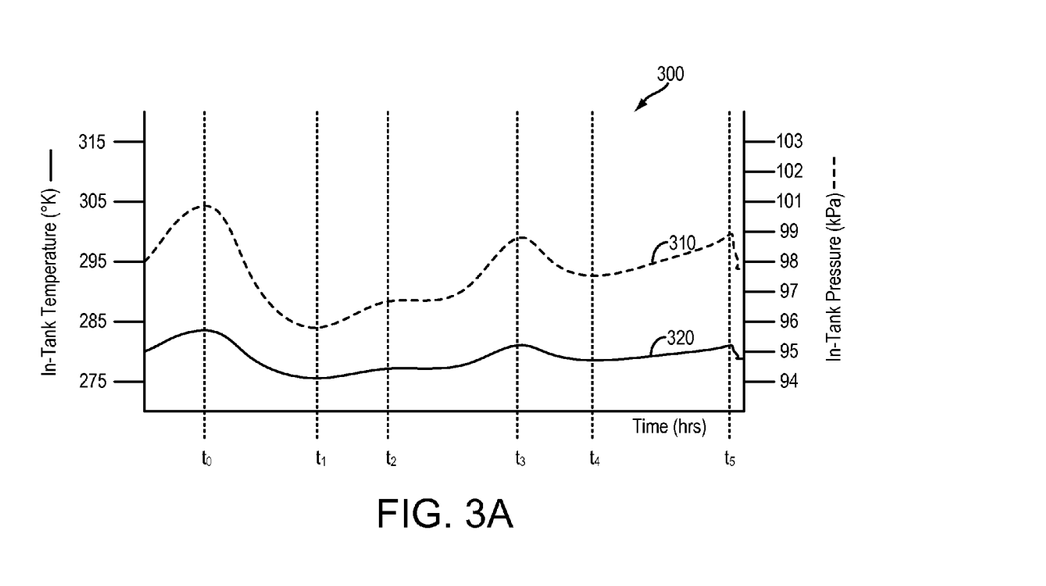
FIG. 3A shows an example time course for in-tank temperature and pressure profiles for a sealed fuel tank.
Figure 3B:
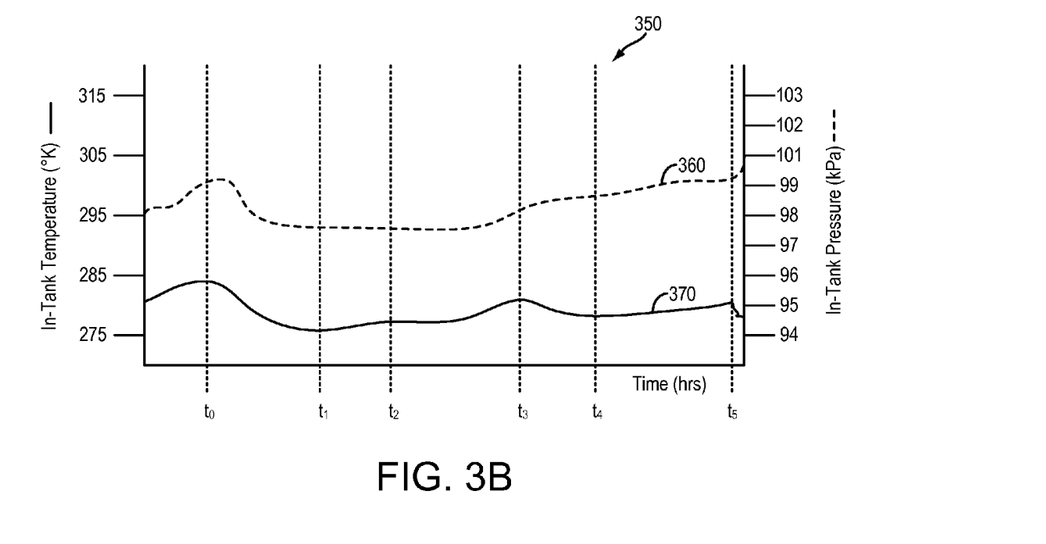
FIG. 3B shows an example time course for in-tank temperature and pressure profiles for a fuel tank comprising a leak.
Figure 4:
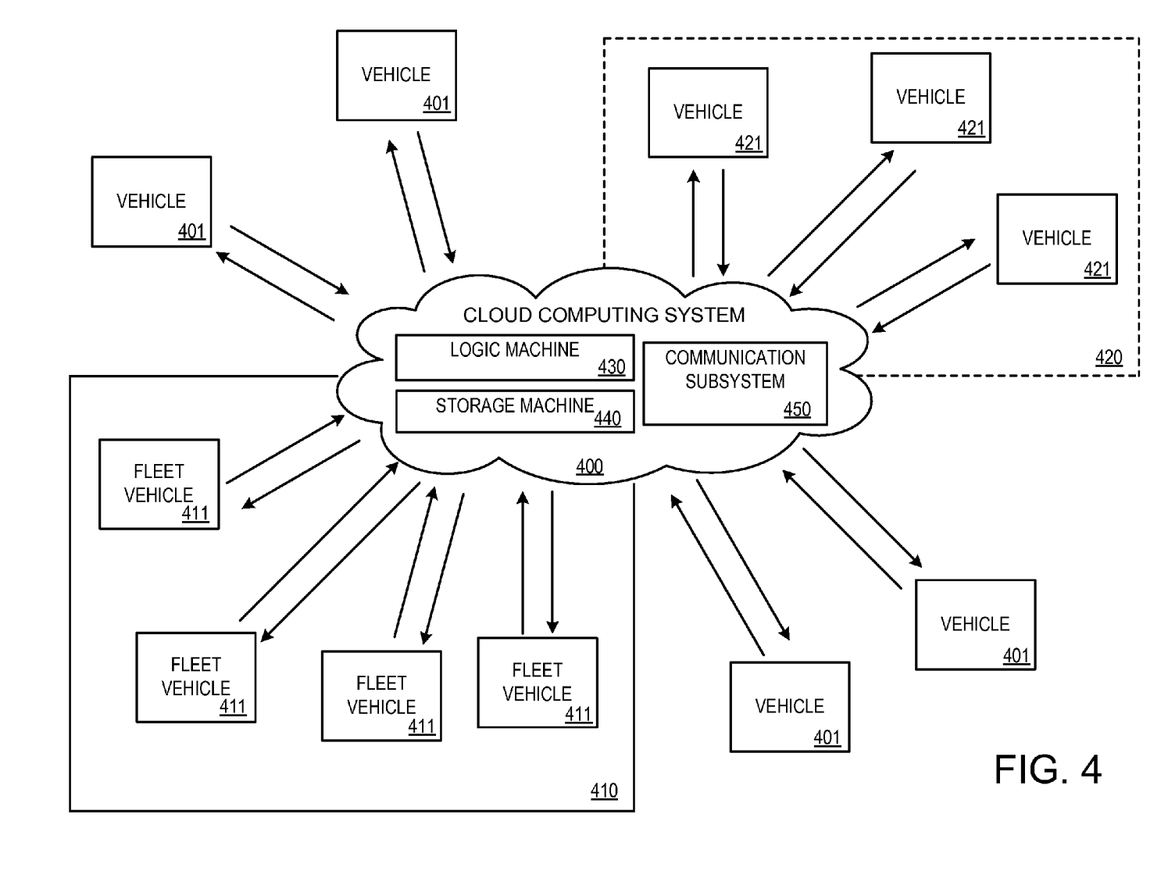
FIG. 4 shows a schematic depiction of a cloud computing system configured to send and receive vehicle information and leak test parameters to a plurality of vehicles.

The following description relates to systems and methods for performing a leak test on a fuel tank. The fuel tank may be included in a vehicle system, such as the vehicle system depicted in FIG. 1. A controller may be configured to perform a leak test on the fuel tank, for example, the method for a correlation-based leak test shown in FIG. 2A. The method may include measuring and characterizing in-tank and ambient temperature and pressure profiles, as shown in FIG. 2B. Example temperature and pressure profiles are depicted in FIGS. 3A and 3B. The temperature and pressure profiles may then be subjected to correlation or similarity analysis, as shown in FIG. 2C. The parameters for correlation or similarity analysis may be derived from the empirical testing results obtained from a plurality of vehicles which have been uploaded and analyzed by a cloud computing system, as depicted in FIG. 4.

Figure 1:
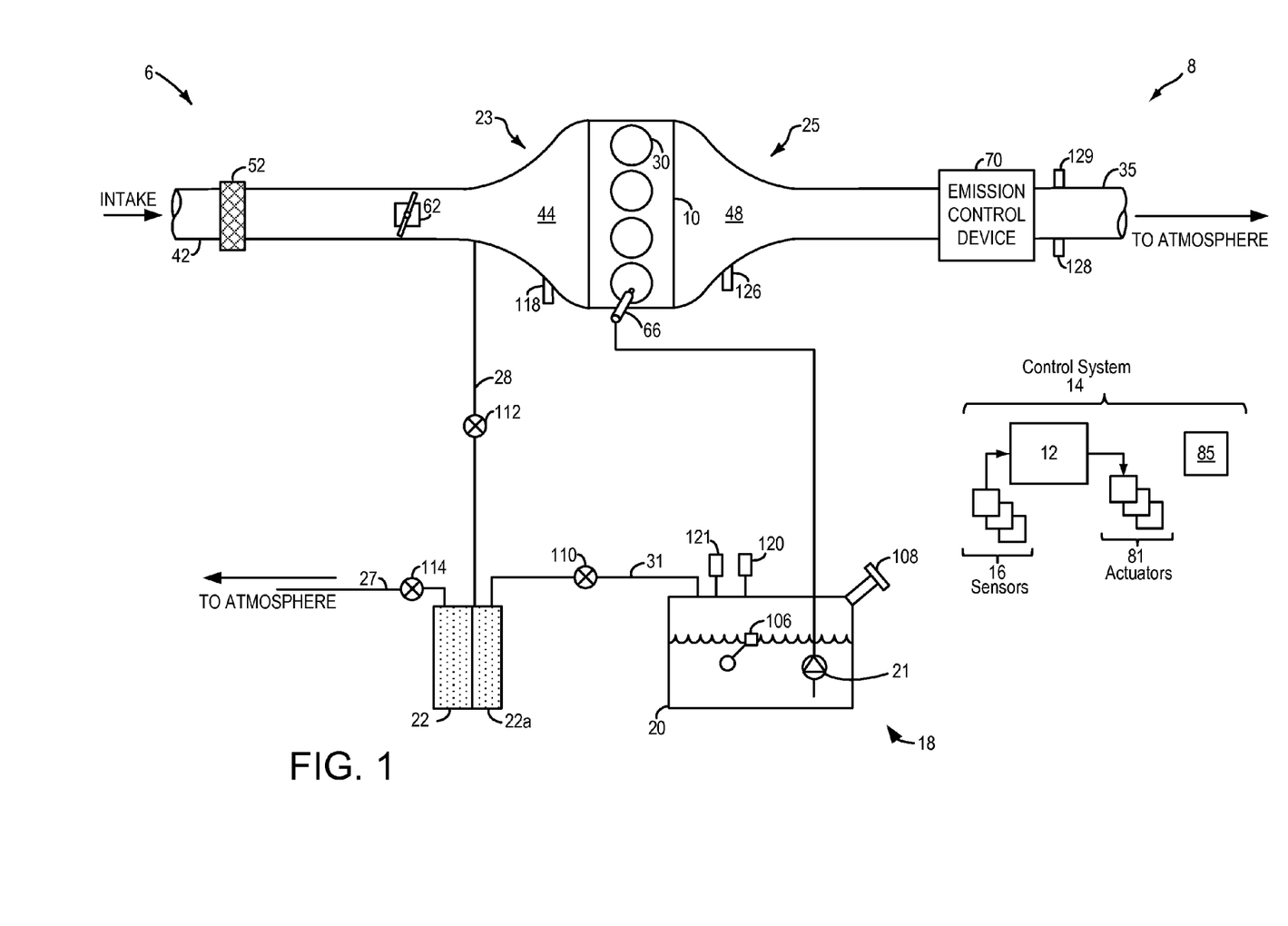
FIG. 1 shows a schematic depiction of a fuel system coupled to an engine system.

FIG. 1 shows a schematic depiction of a hybrid vehicle system 6 that can derive propulsion power from engine system 8 and/or an on-board energy storage device, such as a battery system (not shown). An energy conversion device, such as a generator (not shown), may be operated to absorb energy from vehicle motion and/or engine operation, and then convert the absorbed energy to an energy form suitable for storage by the energy storage device.

Engine system 8 may include an engine 10 having a plurality of cylinders 30. Engine 10 includes an engine intake 23 and an engine exhaust 25. Engine intake 23 includes an air intake throttle 62 fluidly coupled to the engine intake manifold 44 via an intake passage 42. Air may enter intake passage 42 via air filter 52. Engine exhaust 25 includes an exhaust manifold 48 leading to an exhaust passage 35 that routes exhaust gas to the atmosphere. Engine exhaust 25 may include one or more emission control devices 70 mounted in a close-coupled position. The one or more emission control devices may include a three-way catalyst, lean NOx trap, diesel particulate filter, oxidation catalyst, etc. It will be appreciated that other components may be included in the engine such as a variety of valves and sensors, as further elaborated in herein. In some embodiments, wherein engine system 8 is a boosted engine system, the engine system may further include a boosting device, such as a turbocharger (not shown).

Engine system 8 is coupled to a fuel system 18. Fuel system 18 includes a fuel tank 20 coupled to a fuel pump 21 and a fuel vapor canister 22. During a fuel tank refueling event, fuel may be pumped into the vehicle from an external source through refueling port 108. Fuel tank 20 may hold a plurality of fuel blends, including fuel with a range of alcohol concentrations, such as various gasoline-ethanol blends, including E10, E85, gasoline, etc., and combinations thereof. A fuel level sensor 106 located in fuel tank 20 may provide an indication of the fuel level ("Fuel Level Input") to controller 12. As depicted, fuel level sensor 106 may comprise a float connected to a variable resistor. Alternatively, other types of fuel level sensors may be used.

Fuel pump 21 is configured to pressurize fuel delivered to the injectors of engine 10, such as example injector 66. While only a single injector 66 is shown, additional injectors are provided for each cylinder. It will be appreciated that fuel system 18 may be a return-less fuel system, a return fuel system, or various other types of fuel system. Vapors generated in fuel tank 20 may be routed to fuel vapor canister 22, via conduit 31, before being purged to the engine intake 23.

Fuel vapor canister 22 is filled with an appropriate adsorbent for temporarily trapping fuel vapors (including vaporized hydrocarbons) generated during fuel tank refueling operations, as well as diurnal vapors. In one example, the adsorbent used is activated charcoal. When purging conditions are met, such as when the canister is saturated, vapors stored in fuel vapor canister 22 may be purged to engine intake 23 by opening canister purge valve 112. While a single canister 22 is shown, it will be appreciated that fuel system 18 may include any number of canisters. In one example, canister purge valve 112 may be a solenoid valve wherein opening or closing of the valve is performed via actuation of a canister purge solenoid.

Canister 22 may include a buffer 22a (or buffer region), each of the canister and the buffer comprising the adsorbent. As shown, the volume of buffer 22a may be smaller than (e.g., a fraction of) the volume of canister 22. The adsorbent in the buffer 22a may be same as, or different from, the adsorbent in the canister (e.g., both may include charcoal). Buffer 22a may be positioned within canister 22 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine.

Canister 22 includes a vent 27 for routing gases out of the canister 22 to the atmosphere when storing, or trapping, fuel vapors from fuel tank 20. Vent 27 may also allow fresh air to be drawn into fuel vapor canister 22 when purging stored fuel vapors to engine intake 23 via purge line 28 and purge valve 112. While this example shows vent 27 communicating with fresh, unheated air, various modifications may also be used. Vent 27 may include a canister vent valve 114 to adjust a flow of air and vapors between canister 22 and the atmosphere. The canister vent valve may also be used for diagnostic routines. When included, the vent valve may be opened during fuel vapor storing operations (for example, during fuel tank refueling and while the engine is not running) so that air, stripped of fuel vapor after having passed through the canister, can be pushed out to the atmosphere. Likewise, during purging operations (for example, during canister regeneration and while the engine is running), the vent valve may be opened to allow a flow of fresh air to strip the fuel vapors stored in the canister. In one example, canister vent valve 114 may be a solenoid valve wherein opening or closing of the valve is performed via actuation of a canister vent solenoid. In particular, the canister vent valve may be an open that is closed upon actuation of the canister vent solenoid. In some examples, an air filter may be coupled in vent 27 between canister vent valve 114 and atmosphere.

As such, hybrid vehicle system 6 may have reduced engine operation times due to the vehicle being powered by engine system 8 during some conditions, and by the energy storage device under other conditions. While the reduced engine operation times reduce overall carbon emissions from the vehicle, they may also lead to insufficient purging of fuel vapors from the vehicle's emission control system. To address this, a fuel tank isolation valve 110 may be optionally included in conduit 31 such that fuel tank 20 is coupled to canister 22 via the valve. During regular engine operation, isolation valve 110 may be kept closed to limit the amount of diurnal or "running loss" vapors directed to canister 22 from fuel tank 20. During refueling operations, and selected purging conditions, isolation valve 110 may be temporarily opened, e.g., for a duration, to direct fuel vapors from the fuel tank 20 to canister 22. By opening the valve during purging conditions when the fuel tank pressure is higher than a threshold (e.g., above a mechanical pressure limit of the fuel tank above which the fuel tank and other fuel system components may incur mechanical damage), the refueling vapors may be released into the canister and the fuel tank pressure may be maintained below pressure limits. While the depicted example shows isolation valve 110 positioned along conduit 31, in alternate embodiments, the isolation valve may be mounted on fuel tank 20. The fuel system may be considered to be sealed when isolation valve 110 is closed. In embodiments where the fuel system does not include isolation valve 110, the fuel system may be considered sealed when purge valve 112 and canister vent valve 114 are both closed.

One or more pressure sensors 120 may be coupled to fuel system 18 for providing an estimate of a fuel system pressure. In one example, the fuel system pressure is a fuel tank pressure, wherein pressure sensor 120 is a fuel tank pressure sensor coupled to fuel tank 20 for estimating a fuel tank pressure or vacuum level. While the depicted example shows pressure sensor 120 directly coupled to fuel tank 20, in alternate embodiments, the pressure sensor may be coupled between the fuel tank and canister 22, specifically between the fuel tank and isolation valve 110. In still other embodiments, a first pressure sensor may be positioned upstream of the isolation valve (between the isolation valve and the canister) while a second pressure sensor is positioned downstream of the isolation valve (between the isolation valve and the fuel tank), to provide an estimate of a pressure difference across the valve. In some examples, a vehicle control system may infer and indicate a fuel system leak based on changes in a fuel tank pressure during a leak diagnostic routine.

One or more temperature sensors 121 may also be coupled to fuel system 18 for providing an estimate of a fuel system temperature. In one example, the fuel system temperature is a fuel tank temperature, wherein temperature sensor 121 is a fuel tank temperature sensor coupled to fuel tank 20 for estimating a fuel tank temperature. While the depicted example shows temperature sensor 121 directly coupled to fuel tank 20, in alternate embodiments, the temperature sensor may be coupled between the fuel tank and canister 22.

Fuel vapors released from canister 22, for example during a purging operation, may be directed into engine intake manifold 44 via purge line 28. The flow of vapors along purge line 28 may be regulated by canister purge valve 112, coupled between the fuel vapor canister and the engine intake. The quantity and rate of vapors released by the canister purge valve may be determined by the duty cycle of an associated canister purge valve solenoid (not shown). As such, the duty cycle of the canister purge valve solenoid may be determined by the vehicle's powertrain control module (PCM), such as controller 12, responsive to engine operating conditions, including, for example, engine speed-load conditions, an air-fuel ratio, a canister load, etc. By commanding the canister purge valve to be closed, the controller may seal the fuel vapor recovery system from the engine intake. An optional canister check valve (not shown) may be included in purge line 28 to prevent intake manifold pressure from flowing gases in the opposite direction of the purge flow. As such, the check valve may be necessary if the canister purge valve control is not accurately timed or the canister purge valve itself can be forced open by a high intake manifold pressure. An estimate of the manifold absolute pressure (MAP) or manifold vacuum (ManVac) may be obtained from MAP sensor 118 coupled to intake manifold 44, and communicated with controller 12. Alternatively, MAP may be inferred from alternate engine operating conditions, such as mass air flow (MAF), as measured by a MAF sensor (not shown) coupled to the intake manifold.

Fuel system 18 may be operated by controller 12 in a plurality of modes by selective adjustment of the various valves and solenoids. For example, the fuel system may be operated in a fuel vapor storage mode (e.g., during a fuel tank refueling operation and with the engine not running), wherein the controller 12 may open isolation valve 110 and canister vent valve 114 while closing canister purge valve (CPV) 112 to direct refueling vapors into canister 22 while preventing fuel vapors from being directed into the intake manifold.

As another example, the fuel system may be operated in a refueling mode (e.g., when fuel tank refueling is requested by a vehicle operator), wherein the controller 12 may open isolation valve 110 and canister vent valve 114, while maintaining canister purge valve 112 closed, to depressurize the fuel tank before allowing enabling fuel to be added therein. As such, isolation valve 110 may be kept open during the refueling operation to allow refueling vapors to be stored in the canister. After refueling is completed, the isolation valve may be closed.

As yet another example, the fuel system may be operated in a canister purging mode (e.g., after an emission control device light-off temperature has been attained and with the engine running), wherein the controller 12 may open canister purge valve 112 and canister vent valve while closing isolation valve 110. Herein, the vacuum generated by the intake manifold of the operating engine may be used to draw fresh air through vent 27 and through fuel vapor canister 22 to purge the stored fuel vapors into intake manifold 44. In this mode, the purged fuel vapors from the canister are combusted in the engine. The purging may be continued until the stored fuel vapor amount in the canister is below a threshold. During purging, the learned vapor amount/concentration can be used to determine the amount of fuel vapors stored in the canister, and then during a later portion of the purging operation (when the canister is sufficiently purged or empty), the learned vapor amount/concentration can be used to estimate a loading state of the fuel vapor canister.

Vehicle system 6 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 126 located upstream of the emission control device, temperature sensor 128, MAP sensor 118, pressure sensor 120, and pressure sensor 129. Other sensors such as additional pressure, temperature, air/fuel ratio, and composition sensors may be coupled to various locations in the vehicle system 6. For example, ambient temperature and pressure sensors may be coupled to the exterior of the vehicle body. As another example, the actuators may include fuel injector 66, isolation valve 110, purge valve 112, vent valve 114, fuel pump 21, and throttle 62.

Control system 14 may further receive information regarding the location of the vehicle from an on-board global positioning system (GPS). Information received from the GPS may include vehicle speed, vehicle altitude, vehicle position, etc. This information may be used to infer engine operating parameters, such as local barometric pressure. Control system 14 may further include a communications module 85. Communications module 85 may be configured to send and receive information via the internet or other communication networks. Information received from the GPS may be cross-referenced to information available via the internet to determine local weather conditions, local vehicle regulations, etc. Control system 14 may use the internet to obtain updated software modules which may be stored in non-transitory memory.

The control system 14 may include a controller 12. Controller 12 may be configured as a conventional microcomputer including a microprocessor unit, input/output ports, read-only memory, random access memory, keep alive memory, a controller area network (CAN) bus, etc. Controller 12 may be configured as a powertrain control module (PCM). The controller may be shifted between sleep and wake-up modes for additional energy efficiency. The controller may receive input data from the various sensors, process the input data, and trigger the actuators in response to the processed input data based on instruction or code programmed therein corresponding to one or more routines. Example control routines are described herein with regard to FIGS. 2A-2C.

Leak detection routines may be intermittently performed by controller 12 on fuel system 18 to confirm that the fuel system is not degraded. As such, leak detection routines may be performed while the engine is off (engine-off leak test) using engine-off natural vacuum (EONV) generated due to a change in temperature and pressure at the fuel tank following engine shutdown and/or with vacuum supplemented from a vacuum pump. In a sealed fuel tank, changes in fuel tank temperature should be accompanied by according changes in fuel tank pressure—as temperature increases, liquid fuel volatizes, and fuel tank pressure increases. Similarly, as temperature decreases, fuel vapor condenses, and fuel tank pressure decreases. As such, as in-tank temperature exhibits changes in its profile over time, in-tank pressure should exhibit similar changes in its profile over time. However, the exact in-tank pressure that would occur based on an in-tank temperature change is based on numerous factors and properties of the fuel contained in the fuel tank, including fuel type, fuel volatility, and fuel Reid Vapor Pressure (RVP). Detailed information about the fuel contained in the fuel tank may not always be available or accurate.

Figure 2A:
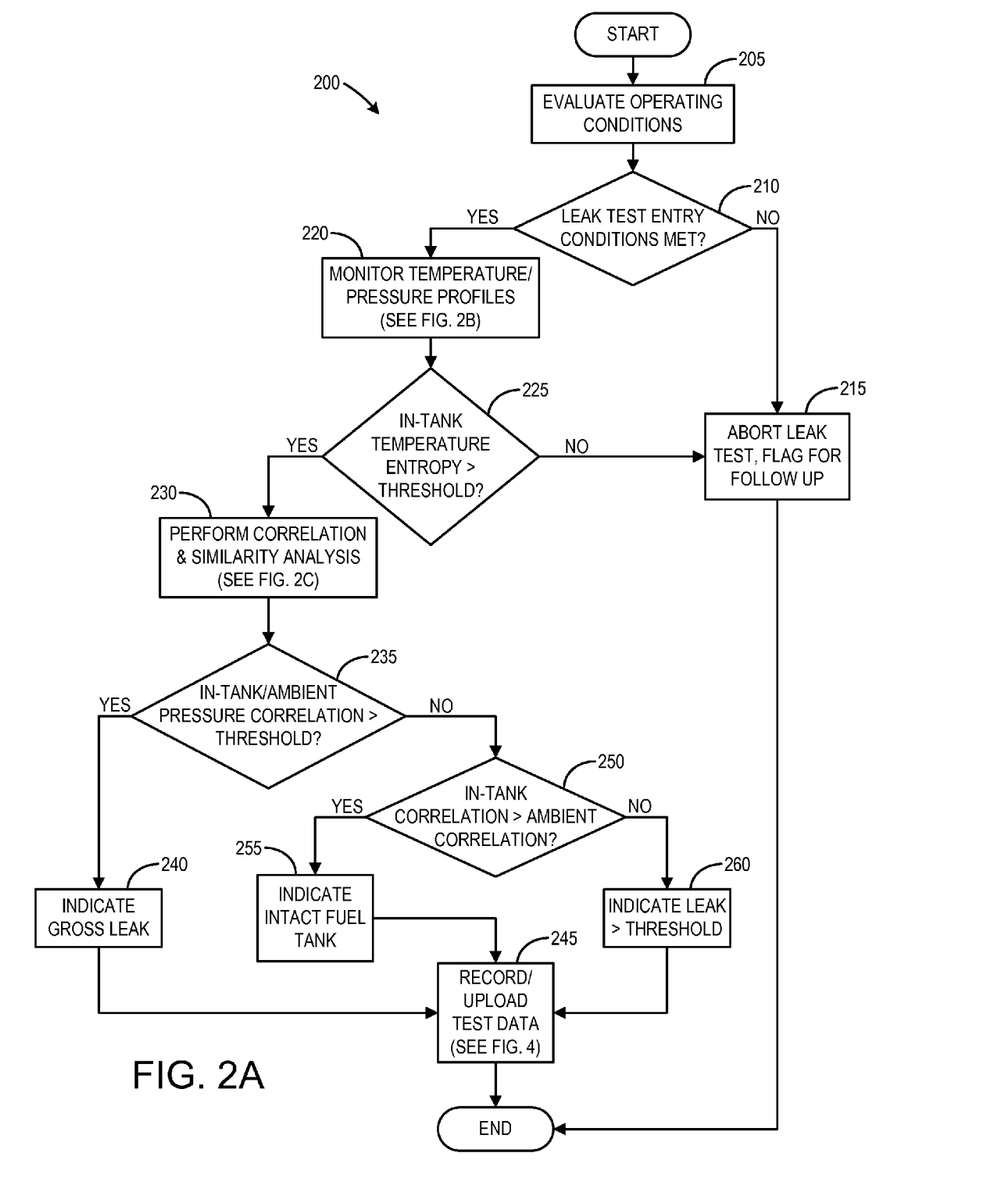
FIG. 2A shows a high level flow chart for a method that may be implemented for performing a fuel tank leak test in accordance with the present disclosure.
Figure 2B:
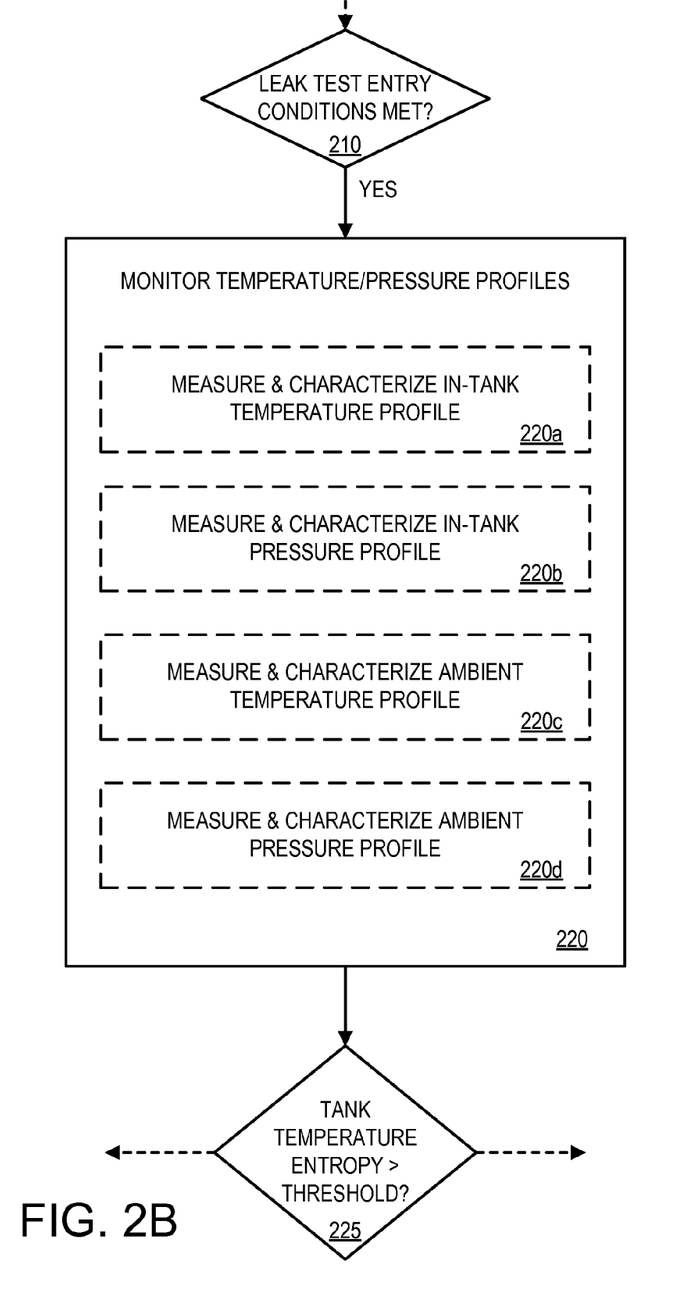
FIG. 2B shows a portion of the high level flow chart depicted in FIG. 2A in greater detail.
Figure 2C:
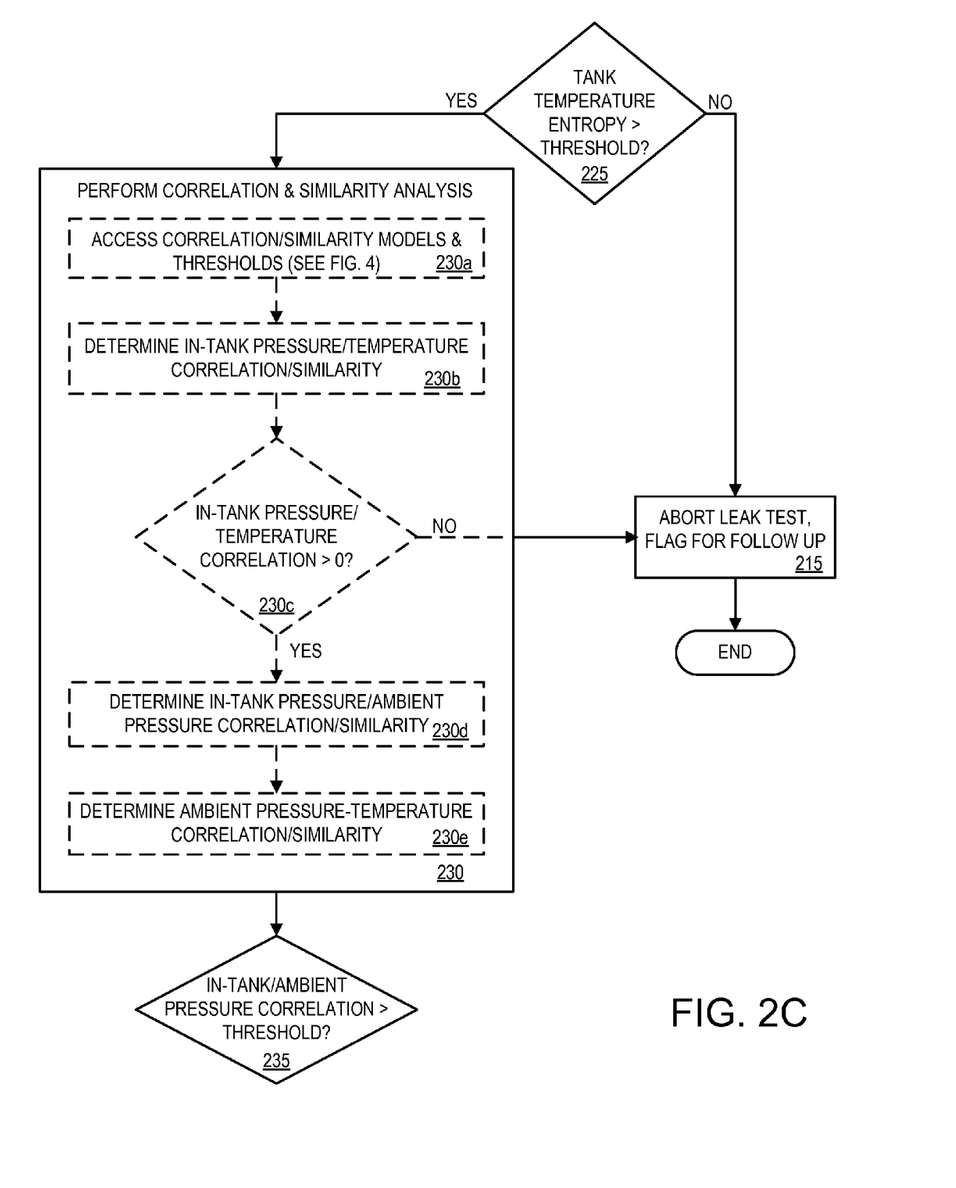
FIG. 2C shows a portion of the high level flow chart depicted in FIG. 2A in greater detail.

FIG. 2A depicts a flow chart for a high-level method 200 for a correlation-based fuel tank leak detection routine. Method 200 will be described herein with reference to the components and systems depicted in FIG. 1, though it should be understood that the method may be applied to other systems without departing from the scope of this disclosure. Method 200 may be carried out by controller 12, and may be stored as executable instructions in non-transitory memory.

Method 200 may begin at 205 by evaluating operating conditions. Operating conditions may include ambient conditions, such as temperature, humidity, and barometric pressure, as well as vehicle conditions, such as engine operating status and fuel level. Continuing at 210, method 200 may include determining whether entry conditions are met for a fuel tank leak test. Entry conditions may include an engine-off condition, and a sealed-system status. The sealed-system status may include a closed FTIV (e.g. in a hybrid vehicle), or a closed CPV and closed CVV in a vehicle that does not include an FTIV. Entry conditions may further include a fuel level between a minimum threshold level and a maximum threshold level. Still further, entry conditions may include a fuel sloshing history below a threshold amount. In other words, excessive fuel sloshing may increase fuel vapors and fuel vapor pressure within a tank beyond a threshold where pressure/temperature correlation may be reliably inferred. By examining the recent fuel level history of the fuel tank, a determination may be made whether fuel sloshing has increased above a threshold. If entry conditions are met but the fuel system is not sealed, method 200 may include sealing the fuel tank from an unsealed condition. This may include sealing an FTIV from an unsealed condition, or may include sealing a CPV and CVV from unsealed conditions.

If entry conditions are not met, method 200 may proceed to 215. At 215, method 200 may include aborting the leak test, and may further include setting a flag to follow-up or retry the leak test at a later time point. If entry conditions are met, method 200 may proceed to 220.

At 220, method 200 may include monitoring temperature and pressure profiles. As shown in more detail in FIG. 2B, monitoring temperature and pressure profiles may include measuring and characterizing an in-tank temperature profile (220a), an in-tank pressure profile (220b), an ambient temperature profile (220c), and an ambient pressure profile (220d). In some examples, the temperature and pressure profiles may be monitored for a pre-determined duration, such as an overnight diurnal soak. In some examples, the temperature and pressure profiles may be monitored for a duration based on current conditions, for example, a duration that comprises an in-tank temperature entropy above a threshold. While monitoring the temperature and pressure profiles, if entry-conditions for the leak test are no longer met (e.g. the fuel tank becomes unsealed, and/or fuel sloshing occurs) the test may be aborted and flagged for follow up. If the leak test is being performed during a vehicle-off condition, controller 12, or another PCM overseeing the test may be maintained on using battery power, for example.

An in-tank temperature profile (220a) may be derived from measurements from an in-tank temperature sensor, such as temperature sensor 121, as shown in FIG. 1. Similarly, an in-tank pressure profile (220b) may be derived from measurements from an in-tank pressure sensor, such as pressure sensor 120. Ambient temperature (220c) and ambient pressure (220d) profiles may be derived from measurements from temperature and pressure sensors coupled to the exterior of vehicle 6. In some examples, ambient temperature and pressure measurements may be based on local weather profiles, as determined through an on-board GPS, for example. Temperature and pressure measurements may be taken on a continuous basis, or may be sampled periodically. Measurements may then be plotted against time, as shown in FIGS. 3A-3B.

FIG. 3A shows an example timeline 300 for a time course for an example leak test for a sealed fuel tank with no leaks. Timeline 300 includes plot 310, which depicts in-tank pressure (in Kpa) over time, and also includes plot 320, which depicts in-tank temperature (in ° K) over time. In this example, the time course depicted occurs on the scale of hours, such as an overnight diurnal cycle. Plots 310 and 320 may be considered an in-tank pressure profile and in-tank temperature profile, respectively, attained during the execution of method 200 as described herein and with regards to FIGS. 2A and 2B.

Timeline 300 depicts six time points ($t_0$, $t_1$, $t_2$, $t_3$, $t_4$, and $t_5$) each denoting the time of an inflection point of in-tank temperature plot 320. In this example (a sealed fuel tank with no leaks), each inflection point of in-tank temperature plot 320 corresponds with an inflection point of in-tank pressure plot 310. For example, as in-tank temperature decreases from time $t_0$ to time $t_1$, in-tank pressure decreases accordingly. As in-tank temperature increases from time $t_2$ to time $t_3$, in-tank pressure increases accordingly. Similarly, an in-tank temperature decrease from time $t_3$ to time $t_4$ and subsequent increase from time $t_4$ to $t_5$ is reflected by an in-tank pressure decrease from time $t_3$ to time $t_4$ and subsequent increase from time $t_4$ to time $t_5$. As described herein, the exact in-tank pressure resulting from a change in in-tank temperature also depends on numerous other factors which may not be known. However, the rise and fall of in-tank pressure with increases and decreases of in-tank temperature may be indicative of an intact fuel tank. This may be further determined through correlation analysis, as described further herein.

FIG. 3A shows an example timeline 350 for a time course for an example leak test for a sealed fuel tank that includes a leak. Timeline 350 includes plot 360, which depicts in-tank pressure (in Kpa) over time, and also includes plot 370, which depicts in-tank temperature (in ° K) over time. Plot 370 demonstrates an in-tank temperature profile that is equivalent to the in-tank temperature profile of plot 320 shown in FIG. 3A. The six time points ($t_0$, $t_1$, $t_2$, $t_3$, $t_4$, and $t_5$) denote the time of an inflection point of in-tank temperature plot 370. The time course is depicted over the scale of hours.

In this example (a sealed fuel tank including a leak), each inflection point of in-tank temperature plot 370 does not necessarily correspond with an inflection point of in-tank pressure plot 360. For example, the in-tank temperature increase from time $t_1$ to time $t_2$ is not reflected by an increase in in-tank pressure. In another example, the in-tank temperature decrease from time $t_3$ to time $t_4$ is not reflected by a decrease in in-tank pressure. Further, the in-tank pressure increases towards atmospheric pressure from time $t_3$ to time $t_5$, with little correlation to the concurrent in-tank temperature changes. As described herein, a change in in-tank pressure that does not correspond with increases and decreases of in-tank pressure may be indicative of a fuel tank containing a leak. This may be further determined through correlation analysis, as described further herein.

When in-tank and ambient temperature and pressure profiles have been obtained, the profiles may then be characterized. Characterizing temperature and pressure profiles may include determining an entropy (and/or profile variance over time) for each obtained profile, and may further include determining recursive estimates of the mean, standard deviation, and/or other parameters for each profile. Values for entropy and for the recursive parameters may be determined for each profile during the monitoring and recording of the respective temperature and pressure profiles, and may then be continuously updated during the monitoring duration.

Returning to FIG. 2A, following the monitoring of temperature and pressure profiles, method 200 may proceed to 225. At 225, method 200 may include determining whether the in-tank temperature entropy is greater than a threshold. The threshold may be predetermined or may be based on current conditions, such as fuel level. If the tank temperature entropy is below the threshold, this may be indicative that the tank pressure profile will not change enough over the monitoring duration to determine the integrity of the fuel tank. Method 200 may then proceed to 215, where the leak test may be aborted and flagged for follow up at a later time point. In some examples, if the temperature and pressure profiles are being continuously monitored, method 200 may return to 220, continuing to calculate the in-tank temperature entropy until either the monitoring duration ends or the in-tank temperature entropy increases above the threshold.

If and when the in-tank temperature entropy is determined to be above the threshold, method 200 may proceed to 230. At 230, method 200 may include performing correlation and similarity analysis based on the in-tank and ambient temperature and pressure profiles and recursive statistic parameters. As shown in more detail in FIG. 2C, correlation and similarity analysis may be determined for in-tank pressure and in-tank temperature (230b), in-tank pressure and ambient pressure (230d), and ambient pressure and ambient temperature (230e). The correlation and similarity analysis may be performed once entropy analysis and recursive stats parameters have been established, and may subsequently be determined continuously throughout the monitoring duration.

Correlation or similarity analysis may be applied to pairs of data sets, such as the pairs described in FIG. 2C. For generic data sets X and Y, a correlation coefficient ρ, may be determined with an algorithm such as the following:

$$\rho_{x,y} = \frac{\text{cov}(X, Y)}{\sigma_X \sigma_Y} = \frac{E[(X - \overline{X})(Y - \overline{Y})]}{\sigma_X \sigma_Y}$$

$\rho_{x,y}$ will comprise a value between −1 and 1. A higher absolute magnitude reflects a higher correlation. The sign of the coefficient reflects whether X and Y would change in the same direction (+) (e.g. X and Y increase or decrease together) or in opposite directions (−) (e.g. X increases as Y decreases and vice-versa). Other algorithms or correlation models, including higher order similarity scores may be applied, either alternatively or additionally. The use of correlation or similarity analysis may allow for the determination of leaks based on temperature and pressure measurements without necessitating a prediction of a specific pressure based on a specific temperature change, and without inherent knowledge of additional impact factors such as fuel Reid Vapor Pressure. The descriptions of correlation or similarity analysis herein may refer to correlation analysis or correlation coefficients for simplicity, but it should be understood that one or more similarity algorithms or models could be used without departing from the scope of this disclosure.

Turning to FIG. 2C, performing correlation and similarity analysis (230) may begin at 230a by accessing models for determining correlation coefficients (and/or similarity scores) as described above. Method 200 may also include accessing thresholds for comparing the correlation coefficients once the coefficients have been established. The thresholds may be based on current operating conditions, such as fuel level, vehicle region, usage, ambient conditions, fuel properties (when known), sloshing conditions, etc. As described further herein, and with regards to FIG. 4, the thresholds may be continuously updated based on acquired test results. The acquired test results may be derived from the vehicle currently undergoing the leak test of method 200, or may be derived from tests performed by multiple vehicles as aggregated by a cloud computing system. As such, the thresholds may be accessed from controller 12, or another on-board PCM. Controller 12 may continuously update thresholds based on repeated leak tests, or may communicate with a cloud server to download the most up-to-date thresholds available for a specific vehicle under a specific set of testing conditions.

Method 200 may continue at 230b by determining one or more correlation coefficients (and/or similarity scores) for in-tank pressure vs in-tank temperature. If the fuel tank is intact, the in-tank pressure and in-tank temperature may have a high correlation coefficient. At 230c, method 200 may include determining whether the in-tank pressure/in-tank temperature correlation coefficient is greater than zero. If the in-tank pressure/in-tank temperature correlation coefficient is not greater than zero, method 200 may proceed to 215, where the leak test may be aborted and flagged for follow-up. A negative correlation may be indicative of a nonsensical result, which may require re-testing. In some cases, a negative correlation may be indicative of a leak, which may be confirmed upon re-testing.

If the in-tank pressure/in-tank temperature correlation coefficient is greater than zero, method 200 may proceed to 230d. At 230d, method 200 may include determining one or more correlation coefficients (and/or similarity scores) for in-tank pressure vs ambient pressure. If there is a gross leak in the fuel tank, the in-tank pressure and ambient pressure may have a high correlation coefficient. Continuing at 230e, method 200 may include determining one or more correlation coefficients (and/or similarity scores) for ambient pressure vs ambient temperature. If there is no leak in the fuel tank, the correlation coefficient for in-tank pressure vs in-tank temperature should be stronger than the correlation coefficient for ambient pressure vs ambient temperature.

Returning to FIG. 2A, following the performance of correlation and similarity analysis, method 200 may proceed to 235. At 235, method 200 may include determining whether the in-tank pressure vs ambient pressure correlation coefficient is greater than a threshold. If ambient pressure and in-tank pressure are highly correlated, this may indicate that the fuel tank is fluidly coupled to the atmosphere via a gross leak. If the relevant correlation coefficient is above the threshold, method 200 may proceed to 240. At 240, method 200 may include indicating a gross leak in the fuel tank. A malfunction indicator lamp (MIL) may be illuminated accordingly. Method 200 may then proceed to 245. At 245, method 200 may include uploading test data to controller 12 and/or a cloud database. Method 200 may then end.

Returning to 235, if the in-tank pressure vs ambient pressure correlation coefficient is less than the relevant threshold, method 200 may proceed to 250. At 250, method 200 may include determining whether the in-tank pressure vs in-tank temperature correlation coefficient is greater than the ambient temperature vs ambient pressure correlation by at least a threshold. If there is no leak in the fuel system, the in-tank correlation coefficient should be stronger than the ambient correlation coefficient. If the in-tank correlation coefficient is greater than the ambient correlation coefficient by at least the threshold amount, method 200 may proceed to 255. At 255, method 200 may include indicating an intact fuel tank (e.g. a passing test). Method 200 may then proceed to 245. At 245, method 200 may include uploading test data to controller 12 and/or a cloud database. Method 200 may then end. If the in-tank correlation coefficient is not greater than the ambient correlation coefficient by at least the threshold amount, method 200 may proceed to 260. At 260, method 200 may include indicating a fuel tank leak of a diameter greater than the testing threshold. Method 200 may then proceed to 245 and upload test data to controller 12 and/or a cloud database. Method 200 may then end.

For each vehicle executing method 200, the recording and uploading of test results provides an opportunity for controller 12 to refine the parameters, correlation/similarity models, and thresholds used to determine the presence/absence of a fuel tank leak. Major impact factors that may influence the temperature/pressure correlations may be identified, and when known, may be leveraged to improve the accuracy and robustness of the leak test. This learning process of refining the parameters of the leak test may be increased in pace by accumulating test results from multiple vehicles. Additionally, accumulating test results from multiple vehicles may provide the ability to use multiple models where applicable, such as for variations in usage, vehicle type, fuel type, etc.

FIG. 4 shows a schematic depiction of a cloud computing system 400 configured to send and receive vehicle information and leak test parameters to a plurality of vehicles. Cloud computing system 400 may be further configured to analyze relevant leak test information based on the received vehicle information, and to develop and refine correlation and/or similarity models, testing parameters, and testing thresholds that may be downloaded to and used by vehicles performing correlation-based fuel tank leak tests, such as the leak test described herein and with regards to FIG. 4. For each vehicle or group of vehicles, as described further herein, cloud computing system 400 may derive major impact factors that may influence the in-tank temperature/in-tank pressure correlation, and provide instructions executable by a powertrain control module (such as controller 12) to use specific correlation/similarity models and testing thresholds based on the values obtained for the major impact factors prior to beginning a fuel tank leak test (e.g. as determined while evaluating operating conditions, such as at 205 of method 200).

Cloud computing system 400 may be coupled to a plurality of vehicles, such as vehicles 401 as shown in FIG. 4. Each vehicle 401 may upload data comprising vehicle information and testing results to cloud computing system 400 via an on-board communications module, such as a modem, GPS, etc. (e.g. communication module 85 as described herein and with regards to FIG. 1). Each vehicle 401 may upload data periodically, continuously, or following one or more completed leak tests. Similarly, each vehicle 401 may download data comprising testing models, parameters and thresholds from cloud computing system 400 periodically, continuously, or at a time point during or surrounding a fuel tank leak test. For example, a vehicle may download data from the cloud computing system prior to initiating a leak test, or as necessary, such as when correlation thresholds are needed to be applied to acquired leak test data. Data may be uploaded and/or downloaded when a communication link has been established between vehicle 401 and the cloud computing system. If no communication link can be established, the vehicle may store data to upload at a later time point when a communication link is established. Similarly, a vehicle may perform a leak test based on the most recently acquired parameters, models, and thresholds when no communications link can be established.

In some examples, a vehicle fleet 410, comprising a plurality of identical fleet vehicles 411 may be coupled to cloud computing system 400. Within each vehicle fleet, the fleet vehicle parameters (e.g. fuel tank size, etc) may be stratified from the variable parameters (e.g. usage, fuel level, etc) to identify major impact factors within vehicle fleet 410. In this way, separate models, parameters, and thresholds may be established at cloud computing system 400 for each combination of major impact factors. Thus, a fleet vehicle 411 could run a fuel tank leak test specific for a set of operating conditions. For example, requirements for sloshing conditions may be relaxed (e.g. more sloshing allowed as an entry condition) if a reliable testing model can be established for a given sloshing condition.

In some examples, a vehicle crowd 420, comprising a plurality of crowd vehicles 421 may be coupled to cloud computing system 400. Within each vehicle crowd 420, identical known parameters (e.g. fuel type, vehicle region) may be stratified from variable parameters (e.g. fuel tank size, vehicle usage, etc.) to identify major impact factors within vehicle crowd 420. Similarly to vehicle fleet 410, separate models, parameters, and thresholds may be established at cloud computing system 400 for each combination of major impact factors. Each crowd vehicle 421 may belong to a plurality of vehicle crowds 420. For example, a vehicle may belong to a vehicle crowd comprising similar or identical vehicle models, a vehicle crowd comprising vehicles within a geographic region, a vehicle crowd comprising vehicles with similar usage patterns, etc.

Crowd sourcing data from multiple vehicles allows for the accumulation of data about leak testing as it relates to vehicle operating conditions at a faster pace than for a single vehicle. Further, crowd sourcing data in this way allows for the accumulation of data with a broader spectrum of usage patterns and environmental impact factors than for a single vehicle. For example, a vehicle driving under conditions that are novel to the vehicle may generate operating conditions novel to the vehicle. If the leak testing model was only refined by the vehicle's history, testing under novel conditions may prove inaccurate or result in a testing error. However, if a vehicle crowd can be established comprising similar vehicles (e.g. the same model) one or more of the crowd vehicles may have encountered the confounding operating conditions, and a correct testing model may be used.

Using a cloud computing system (such as cloud computing system 400) allows for a means to aggregate information from multiple vehicles, vehicle fleets, and vehicle crowds. Additionally, the cloud computing system allows for a centralized place to establish correlation models, testing parameters, and testing thresholds, such that the models, parameters, and thresholds may be continuously updated as new data is uploaded from vehicles. In turn, the models, parameters, and thresholds may be distributed to appropriate vehicles based on usage, geographic location, driving patterns, etc. Each vehicle may store multiple testing models, parameters, and thresholds in non-transitory memory, such that the appropriate test may be executed for a given set of operating conditions.

Data in the cloud computing system (e.g., received data from vehicles, leak test parameters, testing models, etc.) may be organized (e.g., stored) and/or processed on a per-vehicle basis, a per-operating condition basis, and/or in any other suitable manner. For example, data (e.g., all received data) from vehicles of a particular year, make, model, and/or other vehicle identifier or combination of identifiers may be aggregated and utilized to determine leak test parameters and/or testing models for vehicles with that identifier or combination of identifiers. Additionally or alternatively, data from vehicles in a particular geographic region, under a particular operating condition or combination of operating conditions, and/or having a particular value, set, and/or range(s) of parameter(s) may be aggregated and utilized to determine leak test parameters and/or testing models for vehicles with that value, set, and/or range(s) of parameter(s). In additional or alternative embodiments, data in the cloud computing system may be organized and/or processed from a global perspective, whereby information from all vehicles is aggregated and utilized to determine leak test parameters and/or testing models that are not specific to a particular vehicle identifier and/or other vehicle parameter.

Cloud computing system may provide means to study anomalous or abusive usage patterns. For example, failed leak tests may be collected, and the prior usage history for the corresponding vehicles aggregated to look for common usage patterns that may yield failures. Further, the cloud computing system may aid, for example, in establishing emerging trends from vehicle crowds, identifying and correcting emerging or otherwise previously unknown failure models. For example, operating conditions that yield aborted tests may be characterized across a plurality of vehicles, rather than trying to determine a fault within a specific vehicle.

Cloud computing system 400 may take the form of one or more personal computers, server computers, network computing devices, mobile computing devices, and/or other computing devices. For example, cloud computing system 400 may include one or more physically distinct computing systems located remotely from one another and communicatively connected via one or more wired and/or wireless communication links. The communication link(s) may be local (e.g., direct wired and/or wireless communication links) and/or may traverse a network. In additional or alternative embodiments, the cloud computing system 400 may include a single computing system and/or a plurality of computing systems communicatively connected via a bus infrastructure.

Cloud computing system 400 includes a logic machine 430, a storage machine 440, and a communication subsystem 450. Cloud computing system 400 may optionally include a display subsystem, input subsystem, and/or other components not shown in FIG. 4.

Logic machine 430 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 440 includes one or more physical devices configured to hold instructions executable by the logic machine to implement the methods and processes described herein (e.g., method 200 of FIGS. 2A-2C). When such methods and processes are implemented, the state of storage machine 440 may be transformed—e.g., to hold different data.

Storage machine 440 may include removable and/or built-in devices. Storage machine 440 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 440 may include volatile, nonvolatile, dynamic, static, read/write, read-only, random-access, sequential-access, location-addressable, file-addressable, and/or content-addressable devices.

It will be appreciated that storage machine 440 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 430 and storage machine 440 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of cloud computing system 400 implemented to perform a particular function. In some cases, a module, program, or engine may be instantiated via logic machine 43 executing instructions held by storage machine 440. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

Communication subsystem 450 may be configured to communicatively couple cloud computing system 400 with one or more other computing devices, such as communications module 85 installed in one or more vehicles as described herein. Communication subsystem 450 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow cloud computing system 400 to send and/or receive messages to and/or from other devices via a network such as the Internet. For example, the communication subsystem 450 may be configured to communicate with one or more vehicles 401, 411, and/or 421 directly and/or via a network. It is to be understood that the communication subsystem 450 may be configured to communicate with some vehicles/devices directly and other vehicles/devices via a network in some embodiments.

The systems described herein and depicted in FIGS. 1 and 4, and the methods described herein and depicted in FIGS. 2A-2C may enable one or more systems and one or more methods. In one example, a method for an engine, comprising: sealing a fuel tank; and indicating fuel system degradation based on a comparison of a first correlation coefficient, determined based on a change in fuel tank pressure and a change in fuel tank temperature, to a second correlation coefficient determined based on a change in ambient pressure and a change in ambient temperature. The method may further comprise: indicating a fuel system leak if the first correlation coefficient is less than the second correlation coefficient, and may further comprise: indicating an intact fuel system if the first correlation coefficient is greater than the second correlation coefficient. In some embodiments, the method may further comprise: determining a third correlation coefficient based on the change in fuel tank pressure and the change in ambient pressure; and indicating a fuel system leak if the third correlation coefficient is greater than a correlation threshold. Determining the first correlation coefficient may include determining if a fuel tank temperature entropy is greater than an entropy threshold. Determining the first correlation coefficient may further include retrieving a first correlation model based on one or more previous fuel system degradation tests. Determining the second correlation coefficient may include retrieving a second correlation model based on one or more previous fuel system degradation tests. In some embodiments, the first and second correlation models may be retrieved from a cloud computing system coupled to a plurality of vehicles. The technical result of implementing this method is a leak test, such as an engine-off natural vacuum test, that may be performed without knowledge of the properties of the fuel stored in the fuel tank. Method which attempt to predict an in-tank pressure change based on an in-tank temperature change, may assume or mis-estimate the volatility of the fuel stored in the fuel tank, leading to an incorrect analysis. However, the correlation between pressure and temperature for a sealed system may be predicted independently from the fuel properties.

In another example, a method for testing a vehicle fuel tank for leaks, comprising: sealing the vehicle fuel tank; determining whether a fuel tank fill level is between a first fill level limit and a second fill level limit; monitoring fuel tank temperature, fuel tank pressure, ambient temperature, and ambient pressure for a duration; determining entropy levels for fuel tank temperature, fuel tank pressure, ambient temperature, and ambient pressure over the duration; determining recursive means and standard deviations for fuel tank temperature, fuel tank pressure, ambient temperature, and ambient pressure over the duration; determining a first correlation coefficient based on the recursive means and standard deviations for fuel tank pressure and fuel tank temperature over the duration; determining a second correlation coefficient based on the recursive means and standard deviations for ambient pressure and ambient temperature over the duration; and indicating a fuel tank leak if the first correlation coefficient is less than the second correlation coefficient. The method may further comprise: determining a third correlation coefficient based on the recursive means and standard deviations for fuel tank pressure and ambient pressure; and indicating a fuel tank leak if the third correlation coefficient is greater than a correlation threshold. Determining the first correlation coefficient may include determining if the entropy level for fuel tank temperature is greater than an entropy threshold, and may further include retrieving a first correlation model based on one or more previous fuel system degradation tests. Determining a second correlation coefficient may include retrieving a second correlation model based on one or more previous fuel system degradation tests. In some embodiments, the first and second correlation models may be retrieved from a cloud computing system coupled to a plurality of vehicles. The method may further include: determining whether a fuel sloshing amount is below a sloshing threshold prior to monitoring fuel tank temperature, fuel tank pressure, ambient temperature, and ambient pressure for a duration. The technical result of implementing this method is an accurate depiction of the temperature/pressure relationship within a sealed fuel tank. By using recursive estimates (rather than simpler regression models), the temperature/pressure relationship may incorporate the vaporization of fuel with increases in temperature, and the condensation of fuel vapor with decreases in temperature. The correlation between temperature and pressure may then be used to accurately and robustly determine the integrity of the fuel tank.

In yet another example, a system for a vehicle, comprising: a fuel tank temperature sensor coupled to a fuel tank; a fuel tank pressure sensor coupled to the fuel tank; a fuel level sensor coupled within the fuel tank; an ambient temperature sensor; an ambient pressure sensor; one or more valves configured to seal the fuel tank when closed; and a controller configured with instructions stored in non-transitory memory, that when executed cause the controller to: seal the fuel tank; determine whether a fuel tank fill level is between a first fill level limit and a second fill level limit; monitor fuel tank temperature, fuel tank pressure, ambient temperature, and ambient pressure for a duration; determine entropy levels for fuel tank temperature, fuel tank pressure, ambient temperature, and ambient pressure over the duration; determine recursive means and standard deviations for fuel tank temperature, fuel tank pressure, ambient temperature, and ambient pressure over the duration; determine a first correlation coefficient based on the recursive means and standard deviations for fuel tank pressure and fuel tank temperature over the duration; determine a second correlation coefficient based on the recursive means and standard deviations for ambient pressure and ambient temperature over the duration; and indicate a fuel tank leak if the first correlation coefficient is less than the second correlation coefficient. In some embodiments, the controller may be further configured with instructions stored in non-transitory memory, that when executed cause the controller to: determine a third correlation coefficient based on the recursive means and standard deviations for fuel tank pressure and ambient pressure; and indicate a fuel tank leak if the third correlation coefficient is greater than a correlation threshold. The system may further comprise: a communications module configured to communicate with a cloud computing system; and the controller may be further configured with instructions stored in non-transitory memory, that when executed cause the controller to: retrieve one or more correlation models from the cloud computing system via the communications module; determine the first correlation coefficient based on the one or more correlation models; and determine the second correlation coefficient based on the one or more correlation models. In some embodiments, the cloud computing system may be coupled to two or more vehicles. The one or more correlation models may be based on fuel tank leak test results from the two or more vehicles. The technical result of this system is that leak test results and vehicle conditions from a plurality of vehicles may be aggregated at a cloud computing device and the aggregated data used to develop and refine correlation models, thresholds, and parameters. This crowd sourcing of data may allow for broad coverage of usage patterns and other impact factors to be incorporated into the parameters for a vehicle leak test, even if the vehicle itself has not previously encountered these impact factors. This, in turn, may lead to more accurate testing, and fewer testing failures. Failure models and trends may be discovered and applied to crowds or fleets of vehicles that share properties, geographical locations, usage patterns, etc.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
sealing a fuel tank by closing a fuel tank isolation valve; and
while the fuel tank is sealed and the engine is off,
indicating fuel system degradation based on a comparison of a first correlation coefficient, determined based on a change in fuel tank pressure and a change in fuel tank temperature, to a second correlation coefficient determined based on a change in ambient pressure and a change in ambient temperature;
the fuel tank pressure and the fuel tank temperature measured from a fuel tank pressure sensor and a fuel tank temperature sensor, respectively; and
the ambient pressure and ambient temperature measured from an ambient pressure sensor and an ambient temperature sensor, respectively,
wherein determining the first correlation coefficient includes determining if a fuel tank temperature entropy is greater than an entropy threshold;
wherein determining the first correlation coefficient further includes determining a first covariance between fuel tank temperature and fuel tank pressure based on recursive estimates of mean fuel tank temperature and mean fuel tank pressure over a duration, and determining recursive estimates of standard deviation of fuel tank temperature and standard deviation of fuel tank pressure over the duration; and
wherein determining the second correlation coefficient includes determining a second covariance between ambient temperature and ambient pressure based on recursive estimates of mean ambient temperature and mean ambient pressure over the duration, and determining recursive estimates of standard deviation of ambient temperature and standard deviation of ambient pressure over the duration.

2. The method of claim 1, further comprising:
indicating a fuel system leak if the first correlation coefficient is less than the second correlation coefficient; and, after indication of the fuel system leak, uploading data to a cloud computing system coupled to a plurality of vehicles, the data including test data.

3. The method of claim 1, further comprising:
indicating an intact fuel system if the first correlation coefficient is greater than the second correlation coefficient; and, after indication of the intact fuel system, uploading data to a cloud computing system, the data including test data;
wherein the ambient pressure and temperature sensors are coupled to a vehicle including the engine, and the fuel tank pressure and temperature sensors are coupled to the fuel tank.

4. The method of claim 1, further comprising:
aborting a fuel tank leak test if the first correlation is not greater than zero; otherwise, determining a third correlation coefficient based on the change in fuel tank pressure and the change in ambient pressure; and
indicating a fuel system leak if the third correlation coefficient is greater than a correlation threshold;
wherein determining the third correlation coefficient includes determining a covariance between fuel tank pressure and ambient pressure based on recursive estimates of mean fuel tank pressure and mean ambient pressure over the duration, and determining recursive estimates of standard deviation of fuel tank pressure and standard deviation of ambient pressure over the duration.

5. The method of claim 1, where determining the first correlation coefficient includes retrieving a first correlation model based on one or more previous fuel system degradation tests.

6. The method of claim 5, where determining the second correlation coefficient includes retrieving a second correlation model based on the one or more previous fuel system degradation tests.

7. The method of claim 6, where the first and second correlation models are retrieved from a cloud computing system coupled to a plurality of vehicles.

8. A method for testing a vehicle fuel tank for leaks, comprising:
sealing the vehicle fuel tank by closing a canister vent valve and a canister purge valve;
while the fuel tank is sealed and an engine coupled to the fuel tank is off,
determining whether a fuel tank fill level is between a first fill level limit and a second fill level limit;
monitoring fuel tank temperature, fuel tank pressure, ambient temperature, and ambient pressure for a duration based on indications from a fuel tank temperature sensor, a fuel tank pressure sensor, an ambient temperature sensor, and an ambient pressure sensor, respectively;
determining entropy levels for fuel tank temperature, fuel tank pressure, ambient temperature, and ambient pressure over the duration;
determining recursive means and standard deviations for fuel tank temperature, fuel tank pressure, ambient temperature, and ambient pressure over the duration;
determining a first correlation coefficient based on the recursive means and standard deviations for fuel tank pressure and fuel tank temperature over the duration;
determining a second correlation coefficient based on the recursive means and standard deviations for ambient pressure and ambient temperature over the duration; and
indicating a fuel tank leak if the first correlation coefficient is less than the second correlation coefficient.

9. The method of claim 8, further comprising:
after testing the vehicle fuel tank for leaks, uploading data to a cloud computing system coupled to a plurality of vehicles, the data including test data; and further comprising:
if the first correlation coefficient is not greater than zero, aborting testing the fuel tank for leaks and setting a flag to test the fuel tank for leaks at a later time point;
if the first correlation coefficient is greater than zero, determining a third correlation coefficient based on the recursive means and standard deviations for fuel tank pressure and ambient pressure; and
indicating a fuel tank leak if the third correlation coefficient is greater than a correlation threshold.

10. The method of claim 8, where determining the first correlation coefficient includes determining if the entropy level for fuel tank temperature is greater than an entropy threshold.

11. The method of claim 10, where determining the first correlation coefficient includes retrieving a first correlation model based on one or more previous fuel system degradation tests.

12. The method of claim 11, where determining the second correlation coefficient includes retrieving a second correlation model based on the one or more previous fuel system degradation tests.

13. The method of claim 12, where the first and second correlation models are retrieved from a cloud computing system coupled to a plurality of vehicles.

14. The method of claim 8, further comprising:
determining whether a fuel sloshing amount is below a sloshing threshold prior to monitoring fuel tank temperature, fuel tank pressure, ambient temperature, and ambient pressure for the duration.

15. A system for a vehicle, comprising:
a fuel tank temperature sensor coupled to a fuel tank;
a fuel tank pressure sensor coupled to the fuel tank;
a fuel level sensor coupled within the fuel tank;
an ambient temperature sensor;
an ambient pressure sensor;
one or more valves configured to seal the fuel tank when closed; and
a controller configured with instructions stored in non-transitory memory, that when executed cause the controller to:
seal the fuel tank;
while the fuel tank is sealed and the engine is off,
determine whether a fuel tank fill level is between a first fill level limit and a second fill level limit based on indications from the fuel level sensor;
monitor fuel tank temperature, fuel tank pressure, ambient temperature, and ambient pressure for a duration based on indications from the fuel tank temperature sensor, the fuel tank pressure sensor, the ambient temperature sensor, and the ambient pressure sensor, respectively;
determine entropy levels for fuel tank temperature, fuel tank pressure, ambient temperature, and ambient pressure over the duration;
determine recursive means and standard deviations for fuel tank temperature, fuel tank pressure, ambient temperature, and ambient pressure over the duration;
determine a first correlation coefficient based on the recursive means and standard deviations for fuel tank pressure and fuel tank temperature over the duration;
determine a second correlation coefficient based on the recursive means and standard deviations for ambient pressure and ambient temperature over the duration; and
indicate a fuel tank leak if the first correlation coefficient is less than the second correlation coefficient.

16. The system of claim 15, wherein the duration includes when the fuel tank temperature entropy level is greater than a threshold; and where the controller is further configured with instructions stored in non-transitory memory, that when executed cause the controller to:
determine a third correlation coefficient based on the recursive means and standard deviations for fuel tank pressure and ambient pressure over the duration; and
indicate a fuel tank leak if the third correlation coefficient is greater than a correlation threshold;
record fuel tank leak testing data to the non-transitory memory of the controller; and
upload the fuel tank leak testing data to a cloud computing system coupled to a plurality of vehicles.

17. The system of claim 15, further comprising:
a communications module configured to communicate with a cloud computing system; and
where the controller is further configured with instructions stored in non-transitory memory, that when executed cause the controller to:
retrieve one or more correlation models from the cloud computing system via the communications module;
determine the first correlation coefficient based on the one or more correlation models;
determine the second correlation coefficient based on the one or more correlation models; and
abort testing the fuel tank for leaks and set a flag to test the fuel tank for leaks at a later time point if the first correlation coefficient is not greater than zero.

18. The system of claim 17, where the cloud computing system is coupled to two or more vehicles.

19. The system of claim 18, where the one or more correlation models are based on fuel tank leak test results from the two or more vehicles.

20. The method of claim 1, wherein indicating fuel system degradation includes generating test results based on the comparison, the method further comprising uploading test result data to a cloud database for aggregation from multiple vehicles, and downloading updated leak test parameters based on the aggregated results.

* * * * *